(12) United States Patent
Morales

(10) Patent No.: US 12,019,929 B2
(45) Date of Patent: Jun. 25, 2024

(54) METHODS AND PRINTING SYSTEM USING ADAPTIVE CONSUMABLE ESTIMATION IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 129 days.

(21) Appl. No.: 17/707,090

(22) Filed: Mar. 29, 2022

(65) Prior Publication Data

US 2023/0315359 A1 Oct. 5, 2023

(51) Int. Cl.
*G06F 3/12* (2006.01)

(52) U.S. Cl.
CPC .......... *G06F 3/1239* (2013.01); *G06F 3/1219* (2013.01)

(58) Field of Classification Search
None
See application file for complete search history.

(56) References Cited

U.S. PATENT DOCUMENTS

| | | |
|---|---|---|
| 6,921,220 B2 | 7/2005 | Aiyama |
| 6,972,867 B1 | 12/2005 | Venable et al. |
| 8,456,672 B2 | 6/2013 | Oba |
| 2014/0233055 A1 | 8/2014 | Eizenberg et al. |

FOREIGN PATENT DOCUMENTS

| | | | |
|---|---|---|---|
| JP | 2012203024 A | * | 10/2012 |
| JP | 2014191247 A | * | 10/2014 |

* cited by examiner

*Primary Examiner* — Fan Zhang
(74) *Attorney, Agent, or Firm* — Millen, White, Zelano & Branigan P.C.; William F. Nixon

(57) ABSTRACT

A printing system includes an estimation system that stores the dot count value and a stored consumable use value for a recurring print job. The dot count value relates to the dot count of a rendered image for the print job for use in printing operations using estimate settings of the printing device. For a later instance of the print job, the estimation system retrieves the dot count value. It also obtains the current settings for the printing device and applies these settings to the dot count value to determine a current consumable use value. Based on the current consumable use value, the estimation system determines whether use of the current settings will result in an increase of ink or toner use.

20 Claims, 13 Drawing Sheets

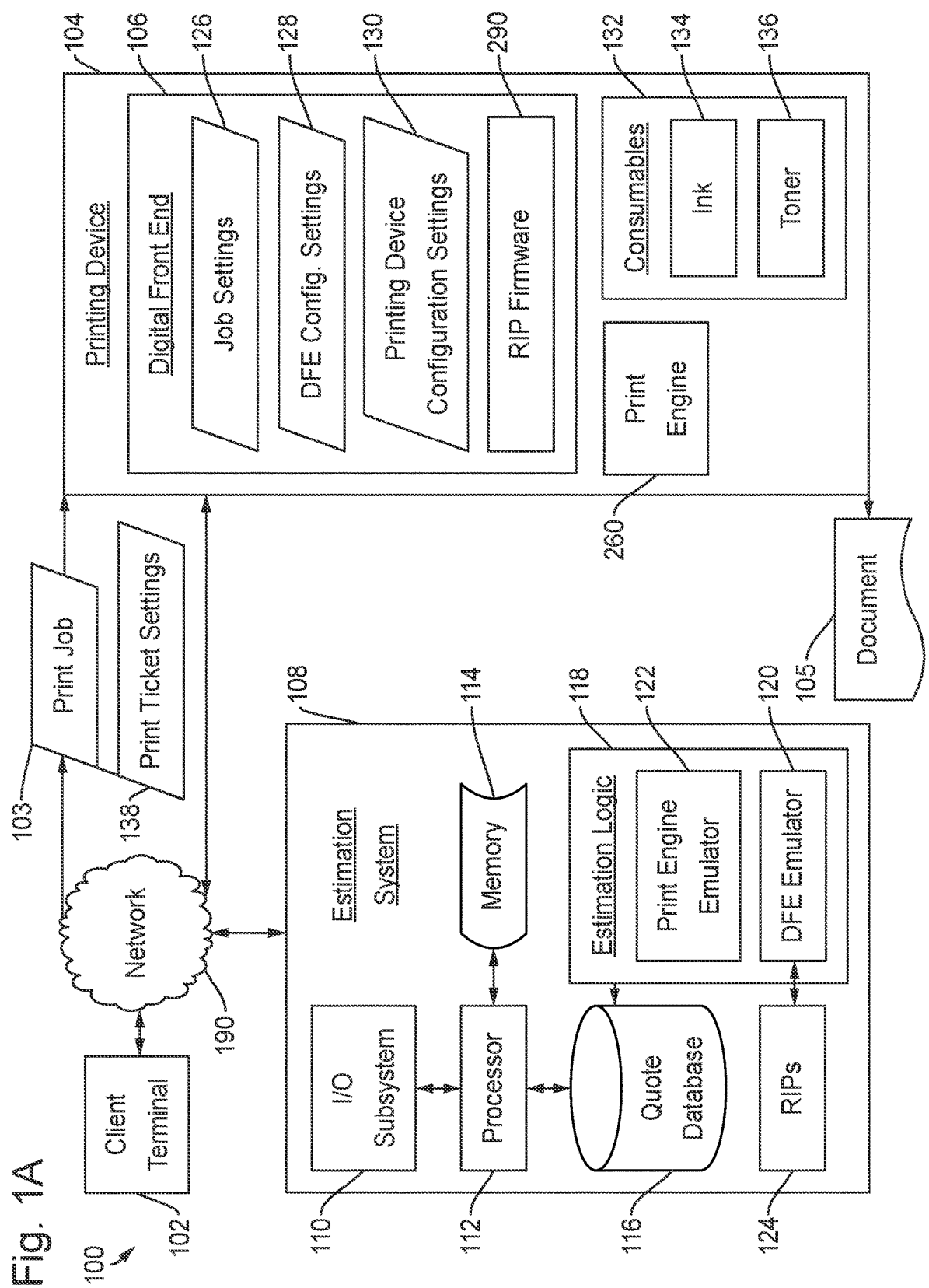

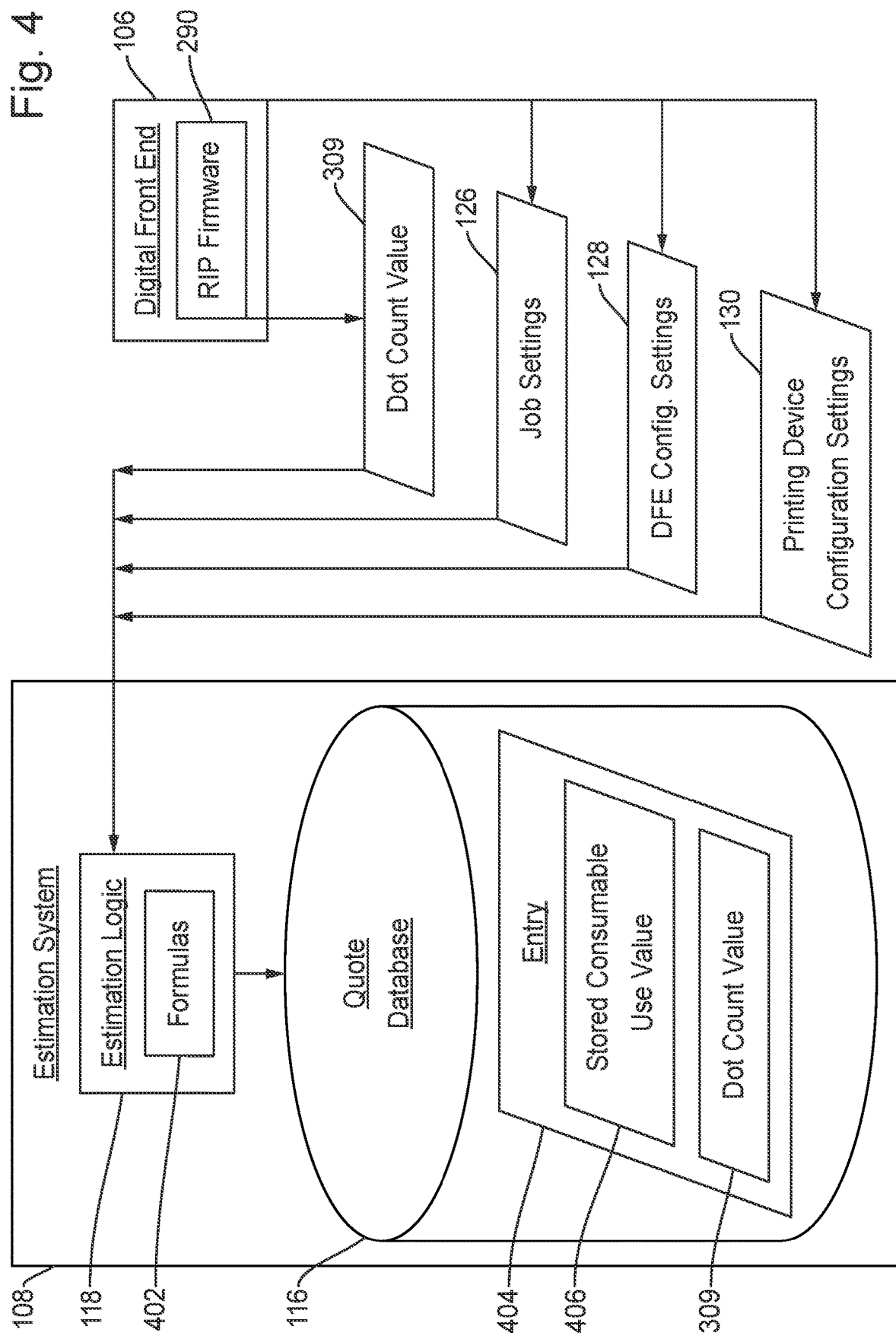

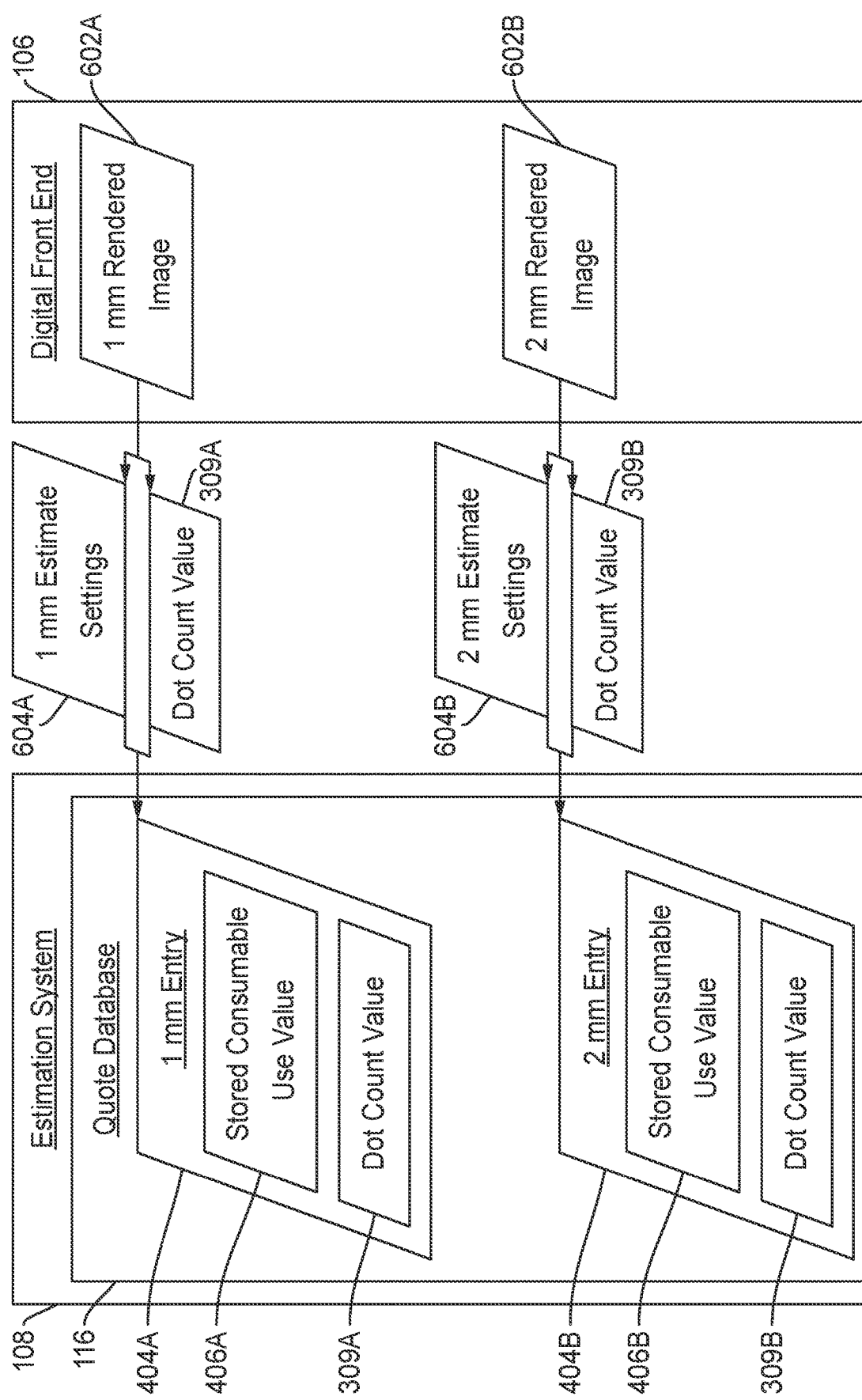

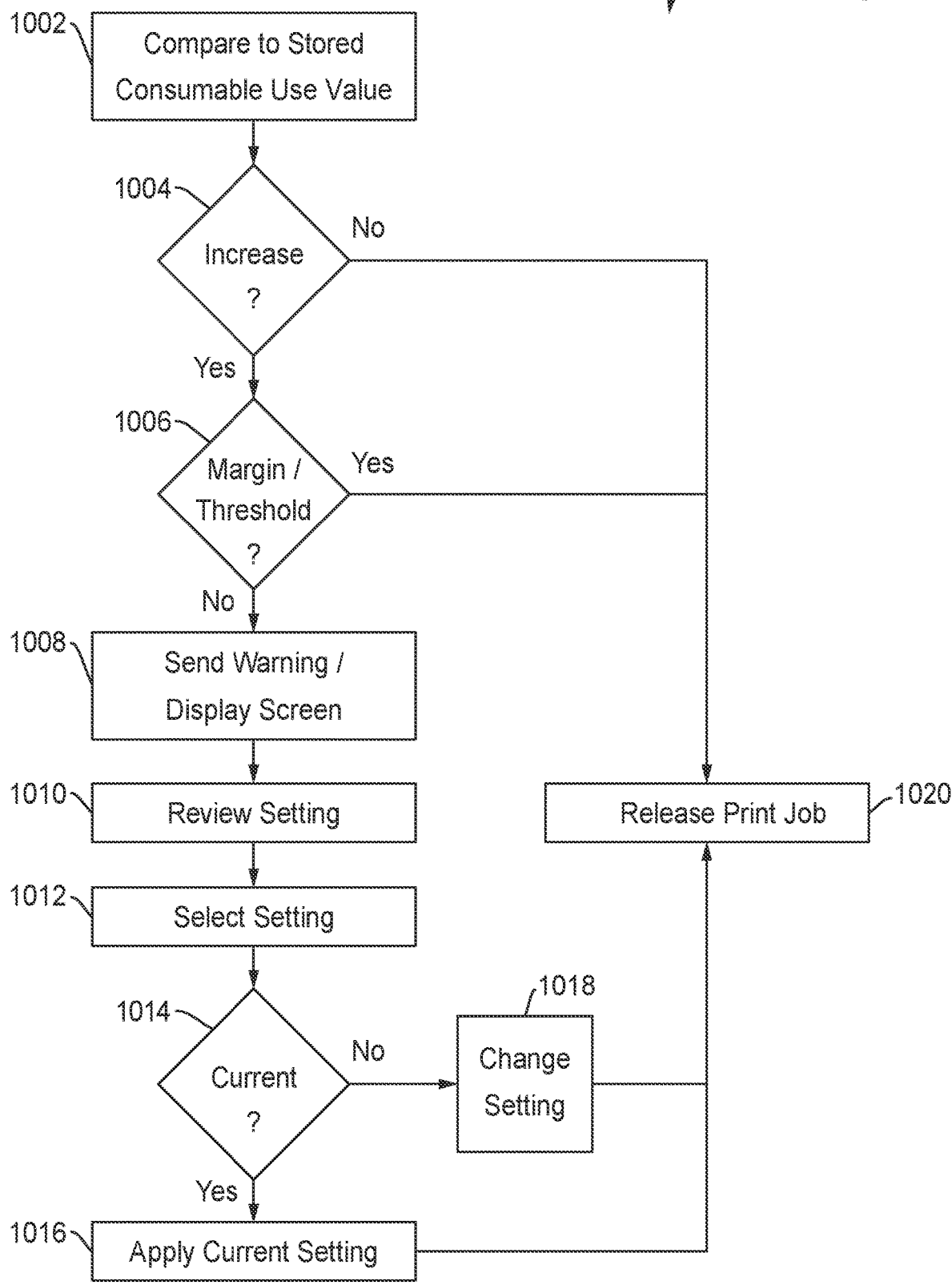

METHODS AND PRINTING SYSTEM USING ADAPTIVE CONSUMABLE ESTIMATION IN PRINTING OPERATIONS

FIELD OF THE INVENTION

The present invention relates to a printing system and associated methods to estimate consumable use in printing operations using adaptive consumable estimation using dot count information.

DESCRIPTION OF THE RELATED ART

Consumable use estimation may be used for print jobs that are estimated once and printed on a recurring basis. For example, credit card statements or utility bills that are sent periodically to a variety of addresses. Once the print shop receives one of these jobs, it may agree to print the print job at a fixed price on a long term basis. For example, the print shop may print statements monthly for 5 years under the contract. Thus, it is important that the print job is printed under the same conditions that were used to estimate the consumable use. Consumable may refer to ink or toner used to print a document associated with the print job. If the same conditions are not implemented, then the print shop may print the print job for less profit, or even a loss.

It may be possible to ensure that print jobs are printed using the same job settings, digital front end (DFE) settings, and printing device settings. A print shop, however, is not always able to ensure the printing device used to reprint a print job years after the consumable use estimation was done will be configured in the same manner. Further, for print shops that implement distributed printing, it may not be feasible to expect printing devices to be configured in the same manner. For example, the altitude of the print location will impact consumable use. Distributed printing may relate to the instance where large print jobs are split and printed at multiple locations in order to reduce shipping and mailing costs. Moreover, print shops may replace printing devices that will generally invalidate all previous consumable use estimates.

SUMMARY OF THE INVENTION

A method for adaptive consumable estimation is disclosed. The method includes determining dot count information from a rendered image for a print job. The method also includes storing the dot count information corresponding to the print job with a stored consumable use estimate corresponding to an estimate setting. The method also includes applying a current setting of a printing device to the dot count information to determine a current consumable use estimate. The method also includes determining that application of the current setting results in an increased amount of ink use over the stored consumable use estimate according to the current ink consumable estimate.

A method for adaptive consumable estimation is disclosed. The method includes determining dot count information from a rendered image for a recurring print job. The method also includes estimating a stored ink use estimate using the dot count information and a plurality of settings. The method also includes storing the dot count information for each respective setting of the plurality of settings. The method also includes retrieving a stored ink use estimate for the print job. The stored ink use estimate corresponds to the plurality of settings used to generate the stored ink use estimate using the dot count information. The method also includes selecting one of the plurality of settings. The method also includes applying a current setting of a printing device to the dot count information to determine a current ink use estimate. The current setting corresponds to the selected setting. The method also includes determining that application of the current setting results in an increased amount of ink use over the stored ink use estimate according to the current ink use estimate.

A method for adaptive consumable use estimation is disclosed. The method includes determining dot count information from a rendered image of a print job. The print job is recurring. The method also includes estimating a stored consumable use estimate by inputting the dot count information to an estimation system. The method also includes modifying the stored consumable use estimate with job settings and printing device settings for a printing device processing the print job. The method also includes storing the dot count information at the estimation system with the stored consumable use estimate. The method also includes determining current job settings and current printing device settings for the print job. The method also includes estimating a current consumable use estimate by retrieving the dot count information. The method also includes modifying the current consumable use estimate with the current job settings and the current printing device settings. The method also includes determining that application of the current job settings and the current printing device settings result in an increased amount of consumable use over the stored consumable use estimate according to the current consumable use estimate.

A method for adaptive consumable estimation for a plurality of printing devices is disclosed. The method includes determining dot count information from a rendered image for a print job at a first printing device. The method also includes storing the dot count information corresponding to the rendered image for the print job at an estimation system. The method also includes retrieving a stored consumable use estimate for the print job from the estimation system. The stored consumable use estimate corresponds to an estimate setting used to generate the stored consumable use estimate using the dot count information. The method also includes applying a current setting of a second printing device to the dot count information. The method also includes determining that application of the current setting to the dot count information results in an increased amount of consumable use over the stored consumable use estimate.

A method for managing printing operations within a printing system is disclosed. The method includes determining dot count information from a rendered image for a print job at a first printing device. The method also includes estimating a stored consumable use estimate by inputting the dot count information into an estimation system. The method also includes modifying the stored consumable use estimate with a group of estimate settings from the first printing device. The method also includes storing the dot count information and the stored consumable use estimate corresponding to the rendered image from the print job at the estimation system. The method also includes receiving a plurality of groups of current settings from a plurality of printing devices. Each group of current settings corresponds to a respective printing device of the plurality of printing devices. The plurality of printing devices includes the first printing device. The method also includes estimating a current consumable use estimate for each group of current settings. The method also includes comparing each current consumable use estimate to the stored consumable use estimate. The method also includes forwarding the print job to at least one printing device of the plurality of printing devices based on the comparison.

A method for determining consumable use for printing operations is disclosed. The method includes determining dot count information from a rendered image for a print job at a first printing device. The method also includes estimating a stored consumable use estimate by inputting the dot count information into a first formula at an estimation system. The first formula is associated with the first printing device. The method also includes storing the dot count information and the stored consumable use estimate corresponding to the rendered image for the print job at the estimation system. The method also includes estimating a secondary consumable use estimate by inputting the dot count information into a second formula at the estimation system. The second formula corresponds to a second printing device. The method also includes determining an increase in consumable use using the secondary settings based on the secondary consumable use estimate.

BRIEF DESCRIPTION OF THE DRAWINGS

Various other features and attendant advantages of the present invention will be more fully appreciated when considered in conjunction with the accompanying drawings.

FIG. 1A illustrates a printing system for printing documents according to the disclosed embodiments.

FIG. 4 illustrates a block diagram of data flow for an estimation system using a dot count value in estimation operations according to the disclosed embodiments.

FIG. 6A illustrates a block diagram of using multiple dot count values and multiple groups of settings in consumable estimation operations according to the disclosed embodiments.

FIG. 10 illustrates a flowchart for further managing printing operations using adaptive consumable use estimation according to the disclosed embodiments.

DETAILED DESCRIPTION OF THE PREFERRED EMBODIMENTS

Figure 1B:
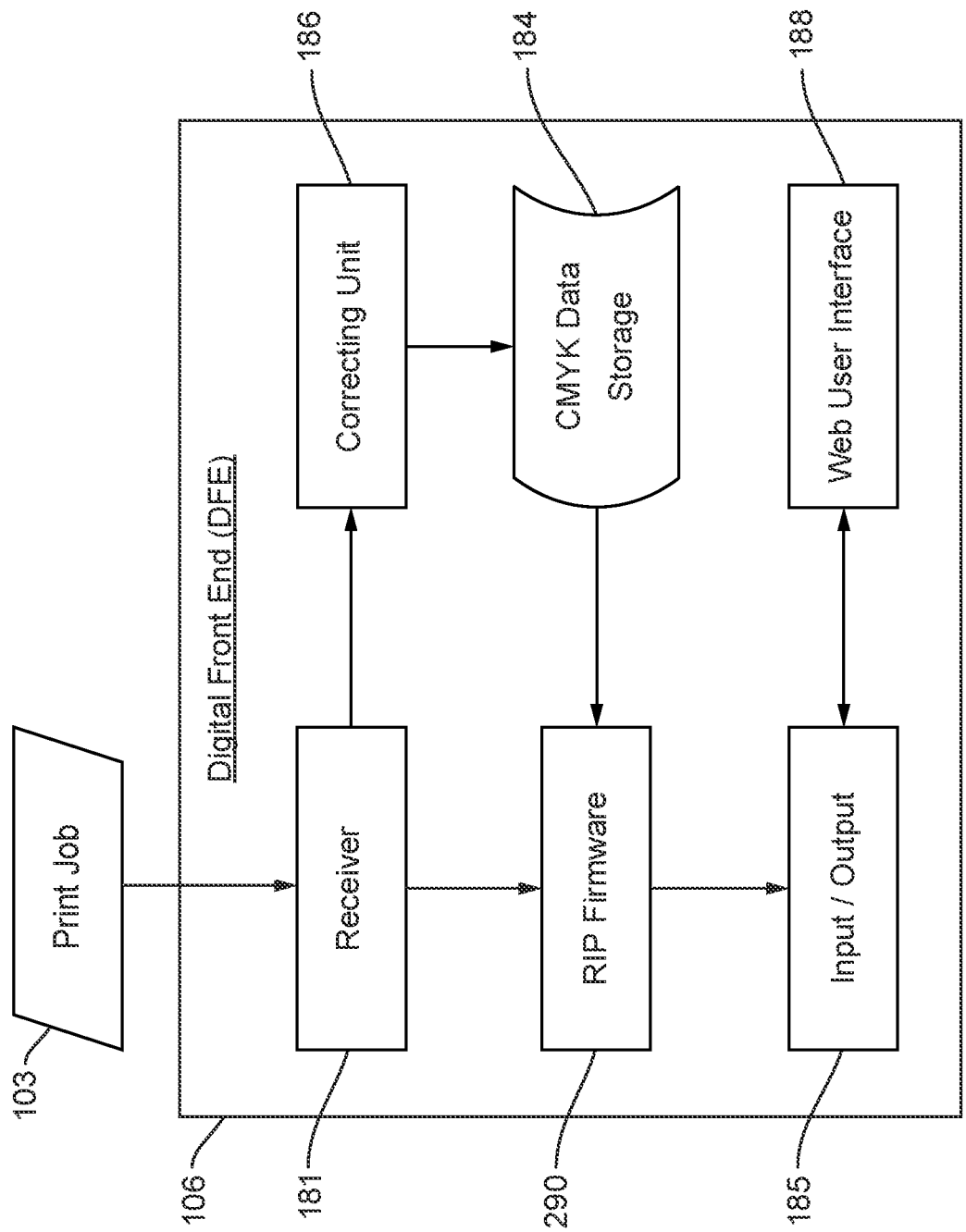
FIG. 1B illustrates a digital front end (DFE) for a printing device according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Proper consumable use estimation considers not just the CMYK values of the rendered content, but how the complete printing system impacts consumable use. In the disclosed embodiments, consumables may refer to ink use or toner use in printing operations. Consumables also may refer to other resources consumed by a printing device during printing, such as sheets or impressions. The disclosed embodiments, however, may focus on ink use and ink use estimation. If the term "ink" is recited in the detailed description below, then the term toner also may be used in its place.

Dot count values are adjusted based on screening and based on certain printing device settings. Dot count values may be derived from the rendered image for the print job. In addition, the consumable use for printhead maintenance is added to the total dot count value. The resultant values may represent total consumable use for the print job. These values may be reported to the operator. It is possible for print jobs with the same images and rendered values to use different amounts of ink or toner based on job or printing device settings.

The disclosed embodiments set forth a printing system that performs consumable use estimation that allows use of a single consumable use estimate with a variety of job settings and printing device configurations, or even different printing device models. The disclosed embodiments may perform consumable use estimation in a typical manner. The disclosed embodiments, however, have the consumable estimation system retain the raw dot count information separately from the consumable use estimation. The estimation system may verify job, digital front end (DFE), and printing device settings. It also may calculate differences in consumable use between settings used to estimate the consumable use and current settings. This feature is possible because settings like halftone or print engine settings are applied as adjustments to the dot count information.

The estimation system may perform a subsequent action. For example, if the consumable use for the current setting is less than the consumable use for the original settings, then the estimation system may release the print job without warning to the operator. The estimation system may still note the differences for the print run in the project information in the estimation system. If the consumable use for the current settings is more than the consumable use for the original settings, then the estimation system may warn the operator. A warning may be displayed along with how much more ink or toner will be used if the print job is printed using the current settings. Optionally, the disclosed embodiments may display additional costs for printing the print job using the current settings. If the project has a margin defined, then the estimation system also may indicate whether the print job will still print in a profitable manner.

The estimation system also may display details about which settings are impacting consumable use. For example, the estimation system may display selected halftone and display additional consumable use and cost versus the halftone used to estimate consumable use. The estimation system also may display individual printing device settings and additional consumable use and cost versus the original settings. Relevant printing device settings may include altitude settings, which really cannot be changed so this is more for cases in which distribution printing is used. Other printing device settings may include ink or toner discharge settings (spitting versus purge sheets) and purge sheet frequencies.

These features will allow the operator to see how much each setting affects consumable use. The operator may decide whether it makes sense to change each individual setting. The estimation system also may provide the operator with the option to select whether to change, or not, individual settings before printing the print job. If the operator chooses to change a setting, then the estimation system will update the additional consumable use information so that the operator may review consumable use effects before deciding whether to apply changes or not.

In addition, the disclosed embodiments may extend the estimation system also to consider changes that require a "re-RIP" process, or regenerating the image. In this instance, the initial estimation would involve multiple dot count operations. For example, if the printing device supports multiple margin settings, such as 1 mm, 2 mm, 3 mm, or 4 mm, then the estimation system may render 4 times, or once for each setting. The estimation system may then store dot count information for all four possible variations. This process also may be done for other settings such as paper, printing device make or model, and the like. The end result would be collection of dot count values to cover a limited set of variations in rasterization.

The disclosed embodiments also may be implemented in a number of other scenarios. For example, printing device fleets may use the same make and model of a printing device. The estimation system will be able to let the operator know how differences in configuration between the printing devices having common features will impact consumable use. Further, the estimation system may allow the operator to compare relative consumable use for all printing devices within a fleet. The print shop may understand how consumable use will vary from printing device to printing device. The print shop may further use this feature to determine the optimal printing device configuration and to ensure all printing devices have this optimal configuration.

The disclosed embodiments also may be used with printing device fleets having different printing device make and models. When printing device make and models differ, the disclosed embodiments may operate as recited above. The estimation system still operates the same. The basic dot count, however, to consumable use formula may be different for different printing devices that may use different ink or toner or use different inkjet heads. This feature will allow print shops to reuse consumable use estimations when moving print jobs between different printing devices or when replacing a printing device with an updated one. This feature also will allow print shops to understand the impact of replacing a printing device.

In general, the consumable, or ink, use from the dot count is modified based on job and printing device settings. Job settings may include halftone settings. Printing device settings may include altitude or printhead maintenance mode settings. The consumable use calculation starts with the dot count, which itself is influenced by color conversion and rendering settings. The calculation modifies it based on job and printing device settings. The dot count consumable user is separated from the other ink use. This feature gives the operator the option to accept the print job or, when the consumable use is higher versus the estimate, to modify these settings to match those used in the estimate. The post dot count adjustments are done without reprocessing the print job. Thus, dot count information is used as input to consumable use estimation and that the estimates based on the dot count are further modified using job and print engine settings.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100. It may receive print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for ink use estimation. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such and C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 is a server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of RIPs 124 available at estimation system 108. Selection of the appropriate RIP provides a better basis to estimate ink use. For example, estimation logic 118 may determine the DFE software version for DFE 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 126, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or estimation system 108, if it is located at a separate device, using, for example, input/output connector 185. Web user interface 188, or web application, allows a user of the DFEs of other printing devices to interact with content or software running on DFE 106.

Figure 2:
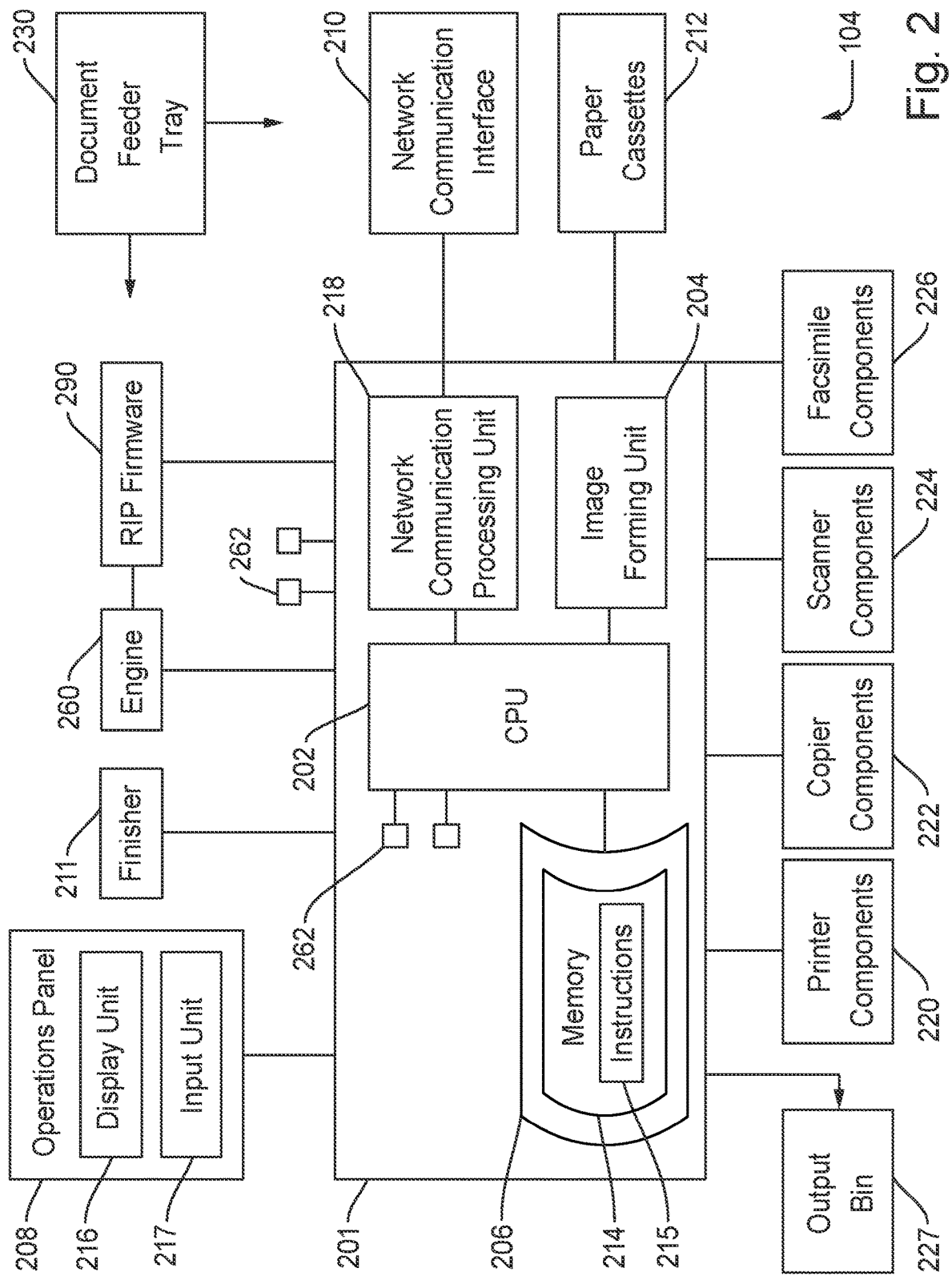
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
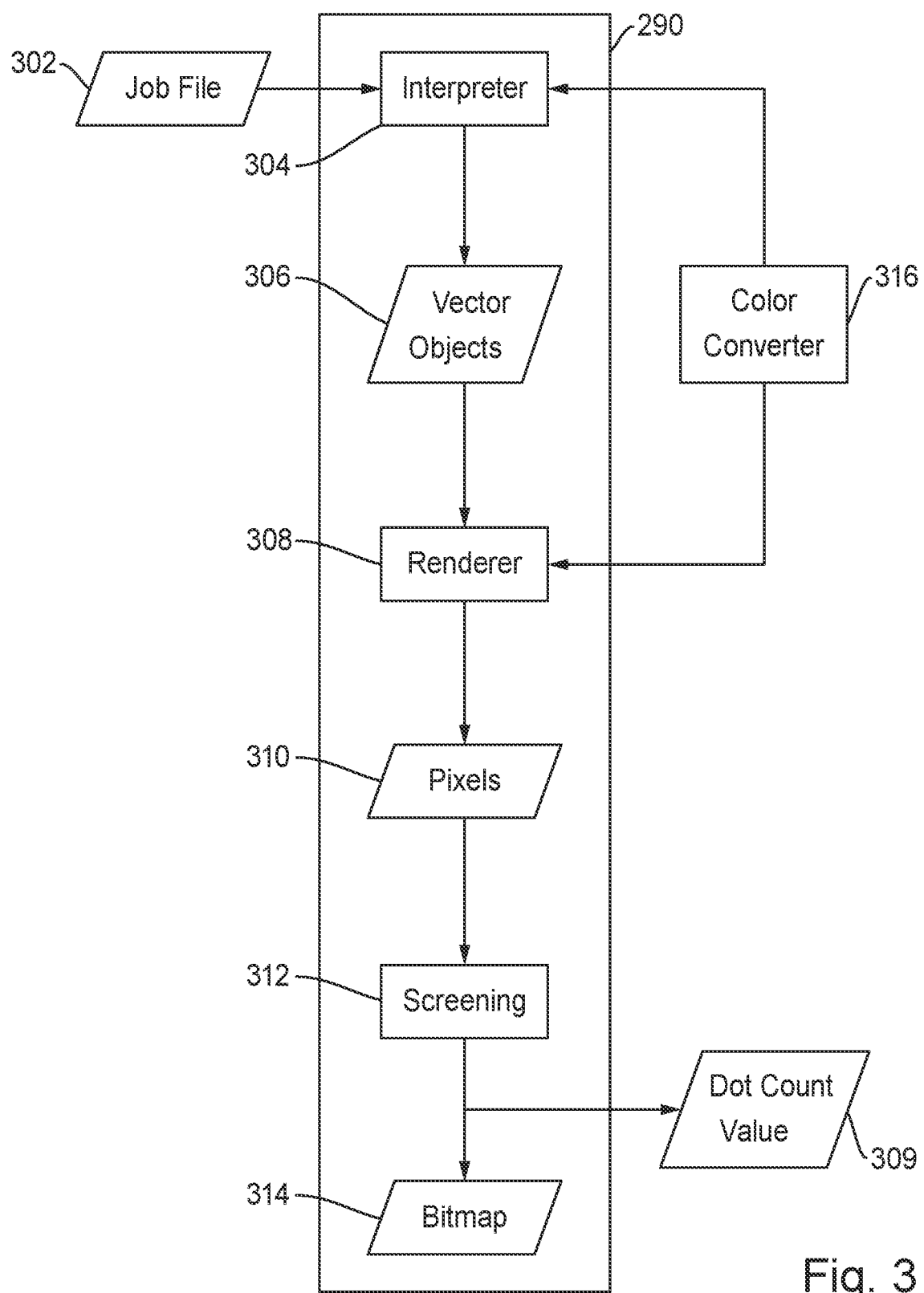
FIG. 3 illustrates a block diagram of RIP firmware used within the DFE according to the disclosed embodiments.

FIG. 3 depicts a block diagram of RIP firmware 290 used within DFE 106 according to the disclosed embodiments. RIP firmware 290 converts text and image data from different file formats including PDF, TIFF, or JPEG into a format that printing device 104 can understand. The process of raster image processing a page implements several steps to be performed, regardless whether the page is submitted as PostScript, PDF, or any other page description language (PDL). In short, RIP firmware 290 may provide interpretation, rasterization, and screening.

Job file 302 may be a job file associated with print job 103. Job file 302 may be a PostScript file in code. Job file 302 may be provided to RIP firmware 290 in DFE 106 to convert its code into raster or bitmap code. Job file 302 is received at interpreter 304, which interprets the commands in the code to redraw the object and elements of a page as vector objects 306. The PDL of job file 302 is read and decoded into graphical elements to be placed on a sheet. Each element may be an image, a character of text, a fill, stroke, and the like or listed in vector objects 306.

Renderer 308 processes vector objects 306 to convert every graphical element into the appropriate pattern of pixels to form the output raster. The resolution independent vector objects are converted into pixels 310. Screening 312 takes the raster image of pixels 310 to form individually screened cyan, magenta, yellow, and black separations. These are halftone dots in the form of a bitmap 314 consisting of commands that can be understood by print engine 260.

RIP firmware 290 also may implement color converter 316. Color converter 316 may implement the functions disclosed above with regard to color conversion. Color converter 316 provides color management and calibration. These actions may be applied during interpretation or rendering, depending on configuration and job content. Color printing resources may be accessed to provide the color management.

RIP firmware 290 may have a software version or other identification associated with it that distinguishes this version from others in system 100. Printing device 104 may implement several different RIP firmware versions depending on the type of print job 103. Further, different printing devices may implement different versions of the RIP firmware. Preferably, RIP firmware 290 is software implemented.

The disclosed embodiments also may determine dot count value 309 from the rendered image provided by renderer 308. Dot count values may be adjusted based on screening 312 and based on settings at printing device 104. Dot count value 309 may be reported to estimation system 108, as disclosed below.

The rendered document, or bitmap 314, may be sent to print engine 260. Estimation system 108 may apply a formula to dot count value 309 along with applicable settings to determine consumable use. Further, the disclosed embodiments may use this information to use a single consumable use estimate with a variety of job settings 126, DFE configuration settings 128, or printing device configuration settings 130. Dot count value 309 should not change once determined from the rendered document from RIP firmware 290. Engine specific settings, such as halftones, however, will impact consumable use at print engine 260, and may differ over time at printing device 104 or at another printing device within system 100.

FIG. 4 depicts a block diagram of data flow for estimation system 108 using dot count value 309 in estimation operations according to the disclosed embodiments. RIP firmware 290 generates dot count value 309 from a rendered image of job file 302 for print job 103. Dot count value 309 may be provided to estimation logic 118 as it estimates consumable use for print job 103. DFE 106 also provides job settings 126, DFB configuration settings 128, and printing device configuration settings 130 to estimation system 108. Estimation logic 118 may use dot count value 309, job settings 126, DFE configuration settings 128, and printing device configuration settings 130 to determine stored consumable use value 406.

These settings influence consumable use. For example, printing device configuration settings 130 may provide information on how often printhead maintenance is performed to determine the ink is used to purge the heads. Other operations may be performed that consume ink or toner but are not related to printing the document captured by the rendered image used to determine dot count value 309. Job settings 126 may include halftone settings that modifies the dot count value for the rendered image of job file 302.

Estimation logic 118 may apply one or more formulas 402 to dot count value 309 to determine the estimated consumable use. After this value is calculated, it is modified based on job settings 126, DFE configuration settings 128, and printing device configuration settings 130. Thus, estimation logic 118 determines a consumable use estimate that is stored in quote database 116 at entry 404. Quote database 116 may include a plurality of entries for different consumable use estimates. Entry 404 may correspond to print job 103 and any initial or baseline estimates provided for print job 103 and DFE 106 given job settings 126, DFE configuration settings 128, and printing device configuration settings 130 applicable at the time the estimate is generated.

For example, entry 404 includes stored consumable use value 406 that corresponds to the generated estimate for print job 103 provided within estimation system 108. Entry 404 also includes dot count value 309. Estimation system 108 retains dot count value 309 separately from any settings, such as job settings 126, DFE configuration settings 128, or printing device settings 130, or other information. This feature of separating consumable use estimates from dot count values for print jobs makes it possible to account for the fact that the same exact images and rendered values use different amounts of ink or toner based on settings at a printing device being used for later printing.

Figure 5A:
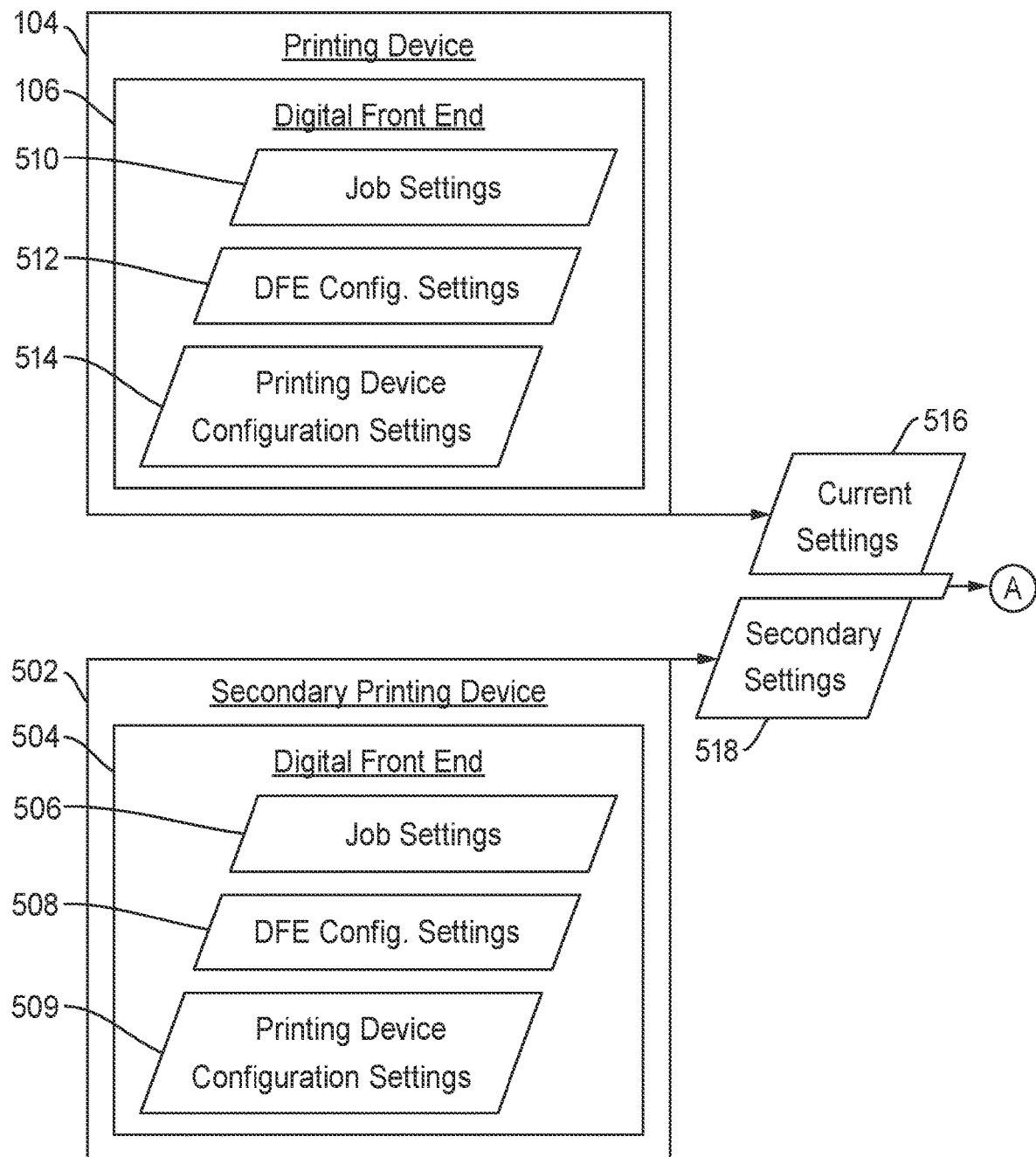
FIG. 5A illustrates a block diagram of data flow for the estimation system for a recurrence of a print job at the printing device or a separate printing device 502 according to the disclosed embodiments.
Figure 5B:
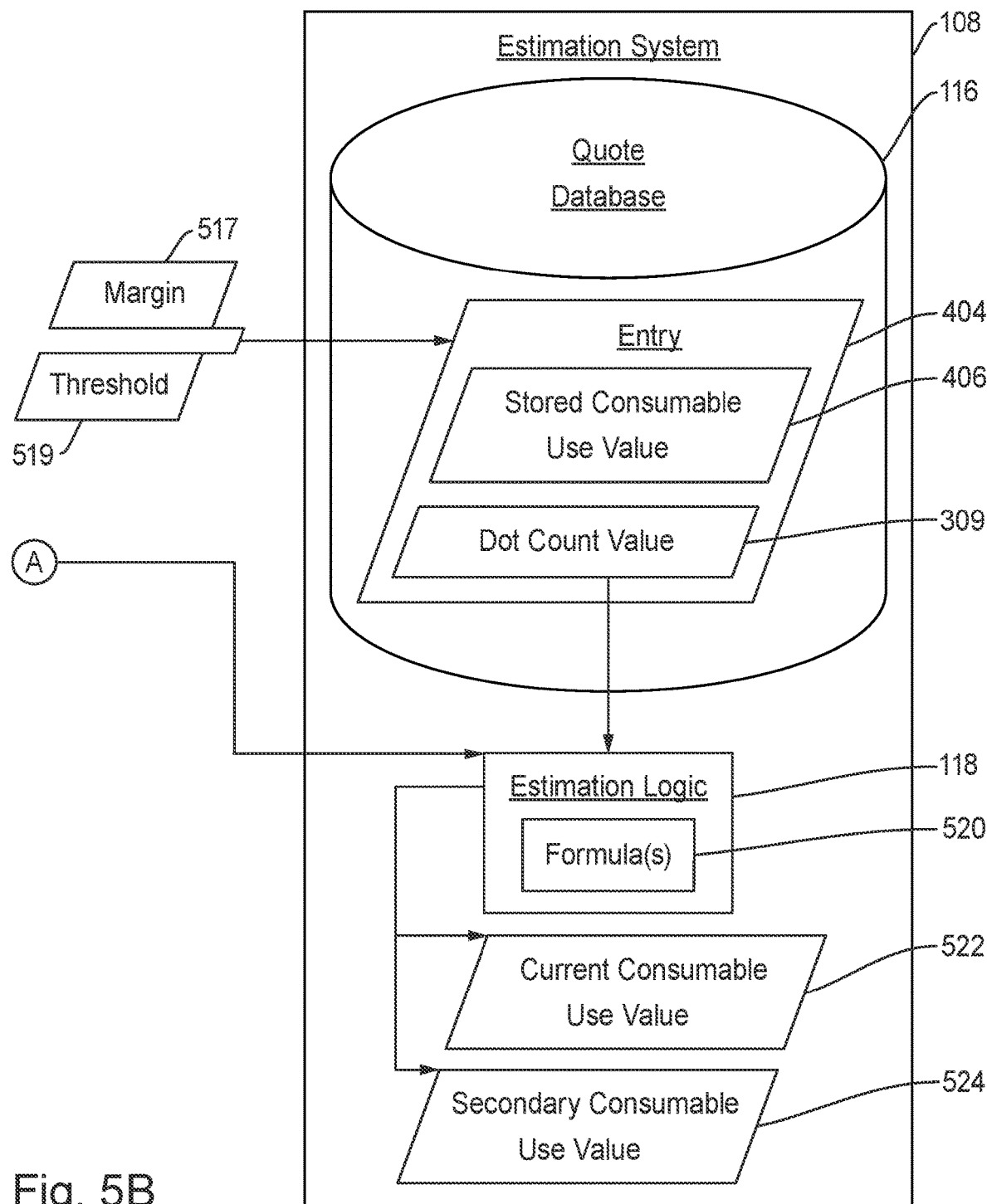
FIG. 5B further illustrates a block diagram of data flow for the estimation system for a recurrence of a print job at the printing device or a separate printing device 502 according to the disclosed embodiments.

FIG. 5 depicts a block diagram of data flow for estimation system 108 for a recurrence of print job 103 at printing device 104 or a secondary printing device 502 according to the disclosed embodiments. A consumable use estimate may be requested or provided at a time later than the original estimate discussed above. This situation may be applicable for recurring printing operations, wherein print job 103 is printed on a regular basis, such as monthly, over a period of time, such as five years. The print shop may desire to know if the original estimate is still valid and that the printing operations are staying within a range of profit based on consumable use. If not, then the print shop may modify the current settings to stay within the range As such, settings may change over the time period. Further, adjustments may occur at printing device 104 that impact how consumables 132 are used for printing document 105 for print job 103. Alternatively, the print shop may deploy a plurality of printing devices to help with printing document 105, if the number of copies or size of print job 103 is too much for a single printing device. Thus, system 100 also may print document 105 on secondary printing device 502. Additional printing devices may be used within system 100 but are not shown here for brevity. Secondary printing device 502 includes its own DFE 504 with job settings 506, DFE configuration settings 508, and printing device configuration settings 509. The settings for secondary printing device 502 likely differ from the same settings for printing device 104. Estimation system 108 takes into account these situations when providing updated consumable use estimates according to the disclosed embodiments.

As disclosed above, entry 404 in quote database 116 includes stored consumable use value 406 and dot count value 309 provided for the original consumable use estimate for print job 103. Estimation system 108 retrieves these values when an updated estimate is needed and provides them to estimation logic 118. Estimation system 108 also retrieves current settings 516 for printing device 104. Current settings 516 include the current settings at DFE 106. FIG. 5 shows these as job settings 510, DFE configuration settings 512, and printing device configuration settings 514. These settings may differ from job settings 126, DFE configuration settings 128, and printing device configuration settings 130 used to calculate stored consumable use value 406.

Estimation logic 118 uses current settings 516 and applies them to dot count value 309 for print job 103 to calculate current consumable use value 522. Settings like halftone or print engine settings are applied as adjustments to dot count information of dot count value 309. Further, estimation logic 118 may implement formula(s) 520 using dot count value 309 as input to determine an initial consumable use value. The adjustments for the settings may be done separately. Formula(s) 520 are disclosed in greater detail below.

For example, in some instances, estimation logic 118 may use formula(s) 520 and dot count information 309 to determine current consumable use value 522. Formula(s) 520 are specific to printing device 104 and DFE 106. After formula(s) 520 are used, then estimation logic 118 may use current settings 516 for adjustments, such as ink or toner used for maintenance or other operations. Thus, estimation system 108 can determine an updated consumable use estimate without having to render an image with RIP firmware 290. This feature reduces processing and use of DFE 106 for estimation operations, especially in recurring print jobs.

Estimation system 108 compares current consumable use value 522 to stored consumable use value 406 to determine whether printing device 104 is operating according to an acceptable, and profitable, manner. Action may be taken based on the comparison. This action may include prompting an operator to select whether to apply current settings 516, apply estimate settings of job settings 126, DFE configuration settings 128, and printing device configuration settings 130. A default operation may prompt estimation system 108 to apply the estimate settings to keep the consumable use within stored consumable use value 406. The operator also may go through each setting to determine which one to use for printing document 105 at this time.

Further, a margin 517 may be defined for stored consumable use value 406 in that if current consumable use value 522 is within the margin, then consumable use is acceptable, or at least profitable, for current settings 516. If current consumable use value 522 is outside this margin, then use of current settings 516 may result in a loss for the print shop. A threshold 519 also may be defined as a not to exceed limit for consumable use. If application of current settings 516 would cause consumable use to exceed threshold 519, then use of current settings 516 also may result in a loss from the print shop.

Sometimes, a print job may be large and require the use of multiple printing devices. Print system 100 may be a fleet of printing devices having the same make and model. Alternatively, system 100 may be a fleet of printing devices having different makes and models. For example, secondary printing device 502 may be used to print document 105 for print job 103. Secondary printing device 502 includes its own DFE 504 that has job settings 506, DFE configuration settings 508, and printing device configuration settings 509 that are provided to estimation system 108 as secondary settings 518.

Estimation system 108 may treat secondary settings 518 like current settings 516 disclosed above to determine a current consumable use value 522 for using secondary printing device 502. Estimation system 108 retrieves dot count value 309 to use in determining a consumable use estimate that is modified by secondary settings 518 to determine secondary consumable use value 524. This process may be applicable if printing device 104 and secondary printing device 502 are the same make and model in that, for example, a single formula of formula(s) 520 may be used for both printing devices to calculate ink or toner usage. For embodiments of different types of printing devices, these embodiments are disclosed in greater detail below.

Estimation system 108 may receive groups of settings from multiple printing devices within system 100. For example, five printing devices may provide a group of settings to estimation system 108, including printing device 104. Estimation system 108 may implement the disclosed embodiments to use dot count value 309 for estimating consumable use for each group of settings. Those groups of settings that match with stored consumable use value 406 may receive print job 103 for printing operations. Those groups of settings that exceed stored consumable use value 406, including any margin 517 or threshold 519, may not receive print job 103 or print document 105. In this way, images do not need to be rendered at each printing device and separate dot count values determined. This feature saves processing time and DFE 106 resources for other activities.

Figure 6B:
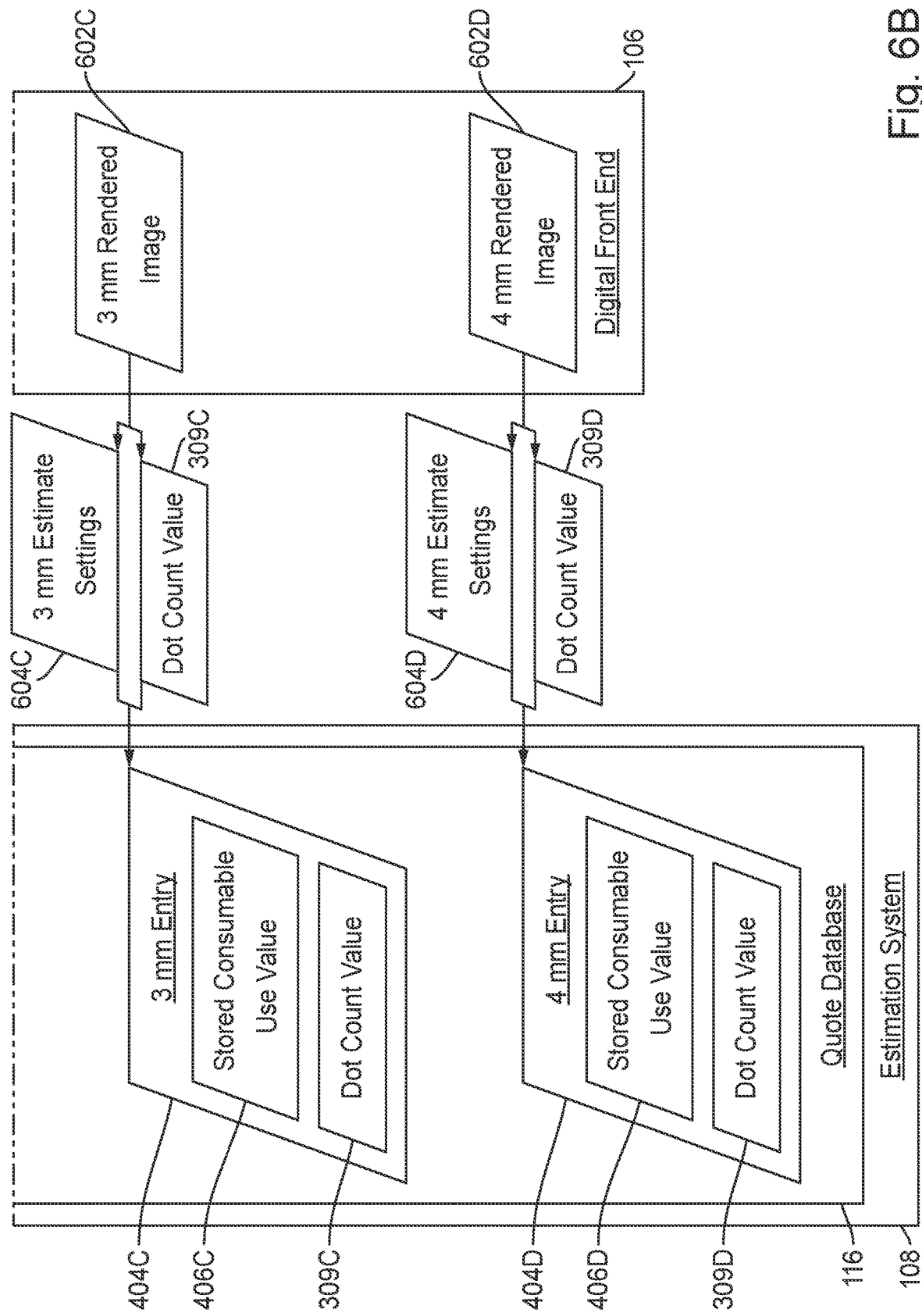
FIG. 6B further illustrates a block diagram of using multiple dot count values and multiple groups of settings in consumable estimation operations according to the disclosed embodiments.

FIG. 6 depicts a block diagram of using multiple dot count values and multiple groups of settings in consumable estimation operations according to the disclosed embodiments. The disclosed embodiments may include features to consider changes that require regenerating the rendered image for dot count value determination. The initial estimation may involve multiple dot count operations. For example, if printing device 104 supports multiple margin settings, such as 1 mm, 2 mm, 3 mm, and 4 mm, then estimation system 108 may request that RIP firmware 290 to render four times, or one for each setting. Estimation system 108 may then store dot count information for all four possible variations. The process may be done for other settings, such as paper, make or model of printing device 104, and the like. The result would be a collection of dot count values to cover a limited set of variation in rasterization.

Thus, using the margin example, DFE 106 may use the embodiments disclosed in FIG. 3 to rendered four images for each margin. The rendered images may be shown as 1 mm rendered image 602A, 2 mm rendered image 602B, 3 mm rendered image 602C, and 4 mm rendered image 602D. The rendered images may correspond to pixels 310 or bitmap 314 in FIG. 3. Using the rendered images for each margin, a dot count value for each margin also is determined. These values along with the job settings, the DFE configuration settings, and printing device configuration settings used in the rendering operation, shown as estimate settings, are provided to estimation system 108 to generate consumable use estimates.

Dot count value 309A is determined from 1 mm rendered image 602A. 1 mm estimate settings 604A also are captured by DFE 106 and sent to estimation system 108. Estimation system 108 generates stored consumable use value 406A that provides an estimate of the consumable use for document 105 printed using a 1 mm margin. It also creates 1 mm entry 404A in quote database 116 to store stored consumable use value 406A and dot count value 309A. This process may be repeated for the other margin settings.

DFE 106 determines dot count value 309B and 2 mm estimate settings 604B for 2 mm rendered image 602B. This information is used by estimation system 108 to generate stored consumable use value 406B stored in 2 mm entry 404B along with dot count value 309B. DFE 106 also determines dot count value 309C and 3 mm estimate settings 604C for 3 mm rendered image 602C. This information is used by estimation system 108 to generate stored consumable use value 406C stored in 3 mm entry 404C along with dot count value 309C. DFE 106 also determines dot count value 309D and 4 mm estimate settings 604D for 4 mm rendered image 602D. This information is used by estimation system 108 to generate stored consumable use value 406D stored in 4 mm entry 404D along with dot count value 309D.

During the recurring printing operation, print job 103 may be changed or selected to print at different margins by the operator. When comparing current consumable use value 522 to a stored consumable use value, the corresponding dot count value is selected to perform the processes disclosed above to determine if the current settings cause in increase in consumable use. As dot count values in entries 404A-404D differ, estimation system 108 identifies which dot count value to use in its formulas and comparison operations for current consumable use value 522.

For example, the operator may select to print document 105 for recurring print job 103 having a 3 mm margin. Estimation system 108 refers to 3 mm entry 404C and identifies dot count value 309C as the dot count value to use in performed the updated consumable use estimate, as disclosed above. Estimation system 108 may obtain current settings 516 for print jobs using a 3 mm margin from DFE 106. Dot count value 309C is used to determine the current consumable use value used to compare against stored consumable use value 406C. It should be noted that the different margins should result in different dot count values and different stored consumable use values.

Figure 7:
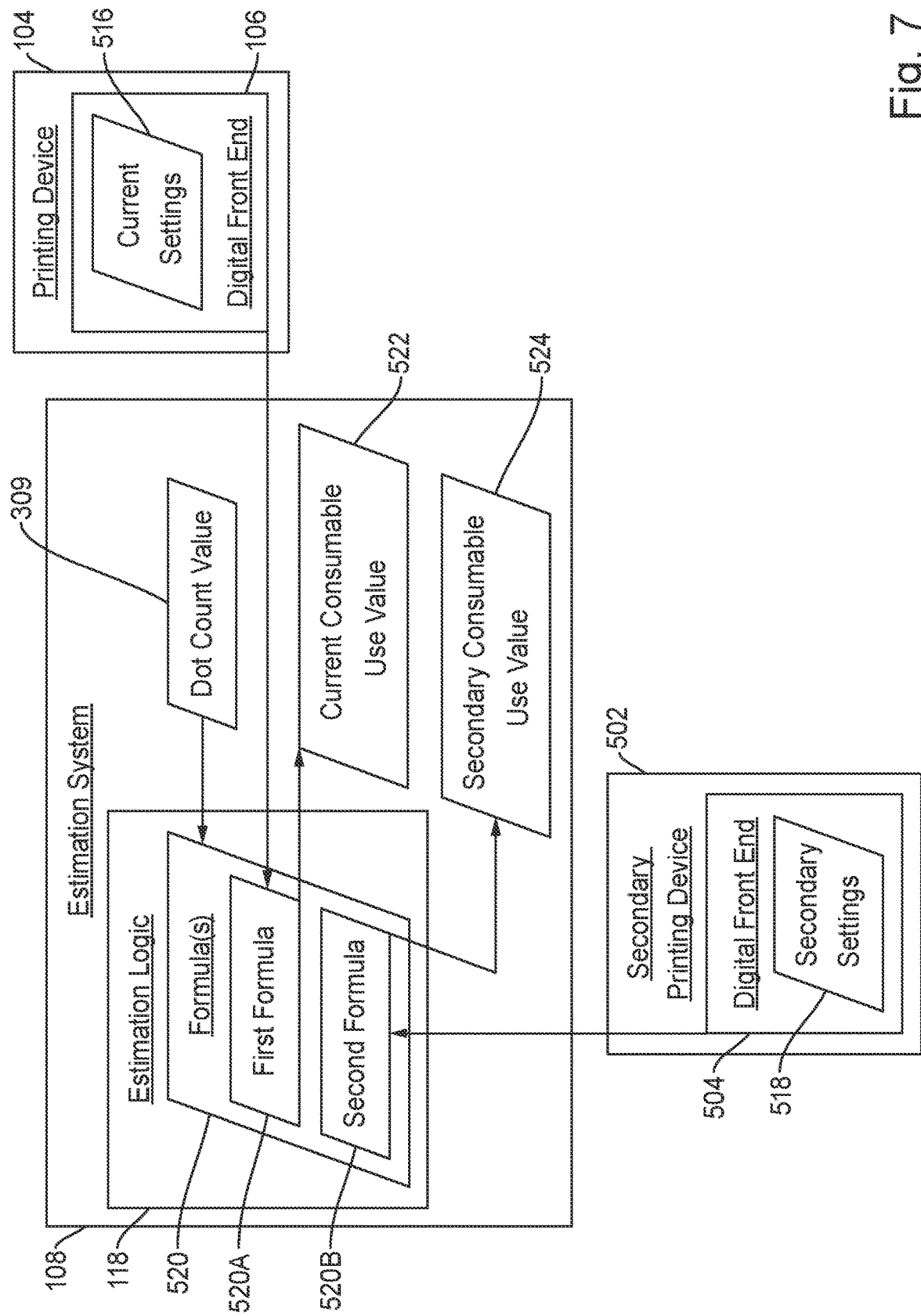
FIG. 7 illustrates a block diagram of the use of different formulas for consumable use estimation according to the disclosed embodiments.

FIG. 7 depicts a block diagram of the use of different formulas for consumable use estimation according to the disclosed embodiments. Some printing device fleets for print job 103 may use printing devices having different makes or models. When printing device make or models differ, estimation system 108 may still work as disclosed above. Dot count values may stay the same for a rendered image but the consumable use formulas may be different for different printing devices that may use different consumables or different inkjet heads as well as different printing device configuration settings. The disclosed embodiments allow system 100 to reuse consumable use estimations when moving jobs between different printing devices or when replacing a printing device with an updated version. The use of estimation system 108 also may allow the print shop to understand the impact of replacing a printing device.

Printing device 104 with DFE 106 and secondary printing device 502 with DFE 504 are shown in FIG. 7. Each printing device may implement a formula to calculate consumable use from the dot count value of a document. These formulas, shown as formula(s) 520, are provided to estimation system 108. Thus, DFE 106 may provide first formula 520A to estimation logic 118, for example, to determine current consumable use value 522 for printing device 104 based on stored dot count values at estimation system 108. DFE 504 may provide second formula 520B to estimation logic 118 to determine secondary consumable use value 524 for printing device 502 based on stored dot count values at estimation system 108.

Ink and toner consumption in printing devices may occur in couple ways. One way is through printing documents. Another way is through maintenance, purging, and head tending. The disclosed embodiments may calculate ink and toner usage. The RIP process used by RIP firmware 290 translates an image into a pattern of dots, or dot counts, expressed in a file format that may be interpreted by a specific printing device. Each dot represents an ink droplet. The intensity of the desired color may be determined by how many dots are being used in a unit area. Variance of the dot size or spacing between the dots yields visually different results. For example, greater color intensity requires greater ink coverage. As a result of this process, RIP firmware 290 dictates how many dots per color comprise the image file. Thus, the amount of ink or toner used in a print job may be calculated by multiplying the dot quantity by the theoretical volume of each droplet. Thus, an example of a formula of formula(s) 520 may be (ink or toner usage)=(number of drops)×(drop volume).

Other factors also may be considered. The modification of head voltages may result I larger or smaller droplet size. Environmental factors such as heat and humidity, or altitude, may also influence the size of the droplet. Any variability in droplet size may result in a difference between actual and calculated ink or toner usage. Besides printing, ink and toner are also consumed by purging and switchover activity. This usage may not be captured in formula(s) 520 and also vary based on settings within the respective printing device. Thus, these amounts should be added to the results of formula(s) 520 to determine current consumable use values 522.

Referring back to FIG. 7, dot count value 309 may be determined for print job 103, as disclosed above. Printing device 104 and secondary printing device 502 may be considered to print document 105 for print job 103. In this example, printing device 104 may be a different make or model than second printing device 502 in that the parameters for ink or toner usage may differ, as reflected in different formulas of first formula 520A and second formula 520B. The disclosed embodiments may determine the current consumable use values for printing print job 103 at the respective printing device using dot count value 309, retrieved from entry 404.

First formula 520A determines an ink or toner usage value that is modified according to current settings 516 for printing device 104 to determine current consumable use value 522. Second formula 520B determines an ink or toner usage value that also is modified according to secondary settings 518 for secondary printing device 502 to determine secondary consumable use value 524. These values may be compared to stored consumable use value 406, as disclosed above, to manage printing operations between printing device 104 and secondary printing device 502.

These features allow print shops to reuse consumable use estimations when moving print jobs between different printing devices or when replacing a printing device. For example, printing device 104 may be taken offline from system 100 such that secondary printing device 502 is now printing documents 105 for print job 103. The disclosed embodiments, using formulas of first formula 520A and second formula 520B, may determine that the consumable use estimates are similar and that the switchover will not increase consumable use cost to the print shop.

Figure 8:
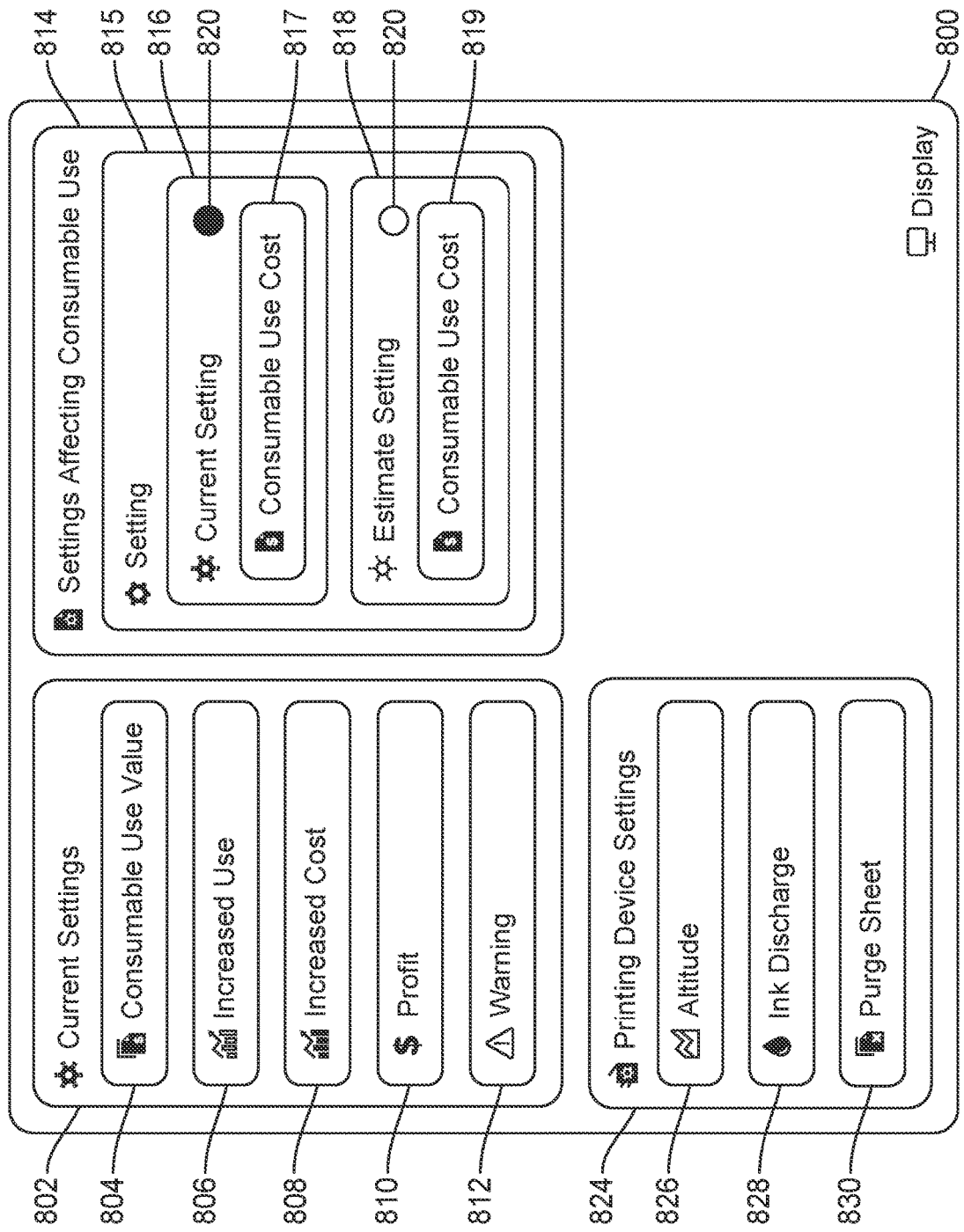
FIG. 8 illustrates an example display screen to show settings and other information that impact consumable use according to the disclosed embodiments.

FIG. 8 depicts an example display screen 800 to show settings and other information that impact consumable use according to the disclosed embodiments. Display screen 800 may be provided to an operator to warn of any increase in ink or toner usage. After the results are determined by estimation system 108, the information used to determine the information and data may be provided to a display connected to estimation system 108. The display may be part of printing device 104 or client terminal 102. Display screen 800 provides the information and includes prompts to make further determinations or take additional actions with regards to consumable usage.

Display screen 800 may be generated when use of current settings 516 will result in an increase in consumable use over the estimated consumable use generated for a print job. If consumable use for the current settings is less than the consumable use for the estimated settings then estimation system 108 may release print job 103 without warning the operator or generating display screen 800. Estimation system 108 may still note the differences between the settings in entry 404 with project information.

If current consumable use value 522 for current settings 516 is more than stored consumable use value 404 for the estimate settings of job settings 126, DFE configuration settings 128, and printing device configuration settings 130, then estimate system 108 may warn the operator by generating display screen 800 and displaying it to the operator. Display screen 800 may display how much more ink or toner will be used if print job 103 is printed using current settings 516. Thus, display screen 800 may include current settings field 802 to show information regarding the use of current settings 516.

Current settings field 802 may include consumable use value field 804 which may relate to current consumable use value 522. It also may include increased use field 806 to display the increased amount of consumables, such as ink or toner, that will be used with current settings 516. Increased cost field 808 may display the additional cost for printing document 105 of print job 103 using current settings 516. Profit field 810 may indicate whether print job 103 will still print in a profitable manner if the print job has a margin or threshold defined in entry 404. Current settings field 802 also may include a warning field 812 to alert the operator that use of current settings 516 will result in increased costs or a loss of profit for print job 103.

Display screen 800 also may include details about which settings are impacting consumable use. Thus, settings affecting consumable use field 814 may provide this information. One or more job settings 510, DFE configuration settings 512, or printing device configuration settings 514 may be displayed. These settings may differ from the estimate settings of job settings 126, DFE configuration settings 128, and printing device configuration settings 130 used to determine stored consumable use value 404.

For example, setting field 815 may be displayed. Setting field 815 may relate to a halftone setting. The operator may select setting field 815 to display further information regarding the corresponding setting. Thus, setting field 815 includes current setting field 816 and estimate setting field 818 for the corresponding setting. Current setting field 816 may include consumable use cost sub-field 817 to display the additional consumable use and cost caused by the setting. Estimate setting field 818 may include consumable use cost sub-field 819 to display the original consumable use and cost to estimate consumable use for stored consumable use value 404.

Display screen 800 also may include individual printing device settings field 824 that lists printing device settings from printing device configuration settings 514 that result in an increase in consumable use. For example, altitude field 826 may relate to an altitude setting for the printing device of interest, ink discharge field 828, and purge sheet field 830. Ink discharge field 828 may correspond to settings related to spitting or purge sheets. Purge sheet field 830 may correspond to settings related to purge sheet frequencies. These fields may include current setting fields and estimate setting fields, as disclosed for setting field 815 disclosed above. These fields may display the additional consumable use and cost versus the estimated consumable use and cost. These features allow the operator to view how much each setting impacts consumable use.

The disclosed embodiments also provide the operator with the option to select whether to change or not change individual settings before printing document 105 for print job 103. Thus, each field for a displayed settings may include select setting button 820 to allow the operator to select the current setting or estimate setting to apply. If the operator chooses to change a setting, then the disclosed embodiments update the additional consumable use information displayed in current settings field 816 so the operator can review ink or toner use effects before deciding whether to apply the change. For example, select setting button 820 may allow the operator to change the setting of setting field 815 from the current setting, shown in current setting field 816, to the estimate setting, shown in estimate setting field 818. The values of the fields in current settings field 816 may be updated accordingly with the estimate setting now being considered a "current" setting.

Figure 9:
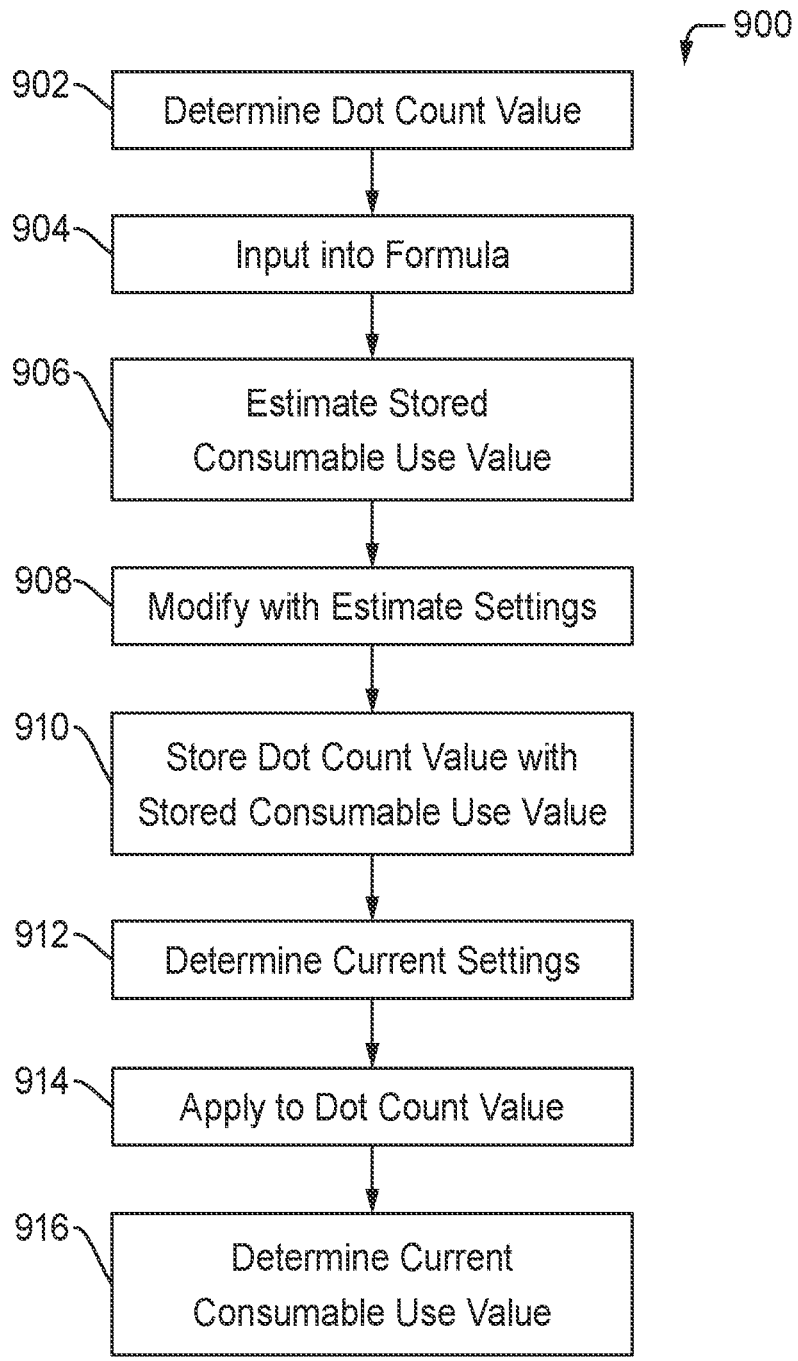
FIG. 9 illustrates a flowchart for managing printing operations using adaptive consumable use estimation according to the disclosed embodiments.

FIG. 9 depicts a flowchart 900 for managing printing operations using adaptive consumable use estimation according to the disclosed embodiments. Flowchart 900 may refer to FIGS. 1A-8 for illustrative purposes. Flowchart 900, however, is not limited by the embodiments disclosed by FIGS. 1A-8.

Step 902 executes by determining dot count value 309 from the rendered image provided by RIP firmware 290 for print job 103. Step 904 executes by inputting dot count value 309 into a formula of formula(s) 520 to calculate consumable use usage. Step 906 executes by estimating stored consumable use value 406 based on the consumable use usage. Step 908 executes by modifying stored consumable use value 406 with the estimate settings that applied to ink or toner use, such as those disclosed above. For example, ink or toner may be used for maintenance operations that are provide in printing device configuration settings 130.

Step 910 executes by storing dot count value 309 with stored consumable use value 406 in entry 404 at estimation system 108. Entry 404 may correspond to print job 103 as an original estimate for consumable use. If print job 103 is a recurring operation, then estimation system 108 will want to check later instances of the print job to make sure that consumable use is at an acceptable level. Thus, step 912 executes by determining current settings 516, as disclosed above. Current settings 516 are provided from printing device 104 to estimation system 108. Alternatively, secondary settings 518 may be provided by one or more secondary printing devices 502.

Step 914 executes by applying current settings 516 to dot count value 309. Dot count value 309 also may be input into a second formula to determine consumable use usage, if applicable. Current settings 516 may change consumable use for print job 103. Step 916 executes by determining current consumable use value 522 as a result. If the disclosed embodiments are determining consumable use at secondary printing device 502, then secondary consumable use value 524 may be determined.

FIG. 10 depicts a flowchart 1000 for further managing printing operations using adaptive consumable use estimation according to the disclosed embodiments. Flowchart 1000 may refer to FIGS. 1A-9 for illustrative purposes. Flowchart 1000, however, is not limited to the embodiments disclosed by FIGS. 1A-9.

Step 1002 executes by comparing current consumable use value 522 to stored consumable use value 406 to determine if application of current settings 516 to print job 103 will increase consumable use. This comparison may be made without having to render the image for the print job a second time. Further, all operations may be performed in estimation system 108, thereby freeing up DFE 106 of printing device 104 for actual printing operations. Step 1004 executes by determining whether an increase will occur by applying current settings 516. If no, then flowchart 1000 proceeds to step 1020 disclosed below.

If step 1004 is yes, then step 1006 executes by determining whether any increase in consumable use is within a margin 517 or threshold 519 defined for print job 103. In some instances, an increase in consumable use still results in a profit for the print shop to print document 105 for print job 103. Margin 517 may be a percentage of consumable use above stored consumable use value 406 that is acceptable for printing at a profit. Threshold 519 may be fixed value above stored consumable use value 406 that allows a profit to be realized to print document 105. The print shop may configure printing operations so that a print job is still printed as long as it is profitable. In some embodiments, step 1006 is not executed. If step 1006 is yes, then flowchart 1000 proceeds to step 1020.

If step 1006 is no, then step 1008 executes by sending a warning or display screen 800 to let the operator know that consumable use for current settings 516 will result in an increased cost. Step 1010 executes by reviewing a setting shown on display screen 800 to determine which one impacts consumable use. There may be more than one setting out of job settings 510, DFE configuration settings 512, and printing device configuration settings 514 that impact consumable use. All settings may be displayed, as disclosed above.

Step 1012 executes by selecting which setting to apply in printing document 105 for print job 103. The operator may toggle through all displayed settings and select to apply either the current setting or the estimate setting used to make the original estimate of stored consumable use value 406. In some embodiments, this step may be executed automatically by applying the original setting provided by printing device 104 to keep print job 103 within the original consumable use estimate.

Step 1014 executes by determining whether the current setting related to increased consumable use is selected. If yes, then step 1016 executes by applying the current setting to print document 105 in this instance. If step 1014 is no, then step 1018 executes by changing the current setting to the original, or estimate, setting associated with stored consumable use value 406. These original settings may be stored with entry 404 to application as needed. Steps 1016 and 1018 proceed to step 1020, which executes by releasing print job 103 to be printed. Information may be compiled and provided by entry 404. Estimation system 108 may still note the differences for the print run in entry 404 for future consideration or tracking.

Flowcharts 900 and 1000 also may be executed for embodiments having different printing devices. In some embodiments, comparison of the consumable use values may be used to select the most appropriate printing device to complete print job 103. Flowcharts 900 and 1000 also may be used in instances where multiple groups of settings are provided for a print job, such as difference print margins that affect consumable use.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for adaptive consumable use estimation for a plurality of printing devices, the method comprising:
    determining dot count information from a rendered image for a print job at a first printing device;
    storing the dot count information corresponding to the rendered image for the print job at an estimation system;
    estimating a consumable use estimate for the print job using the dot count information and a first configuration setting of the first printing device, wherein the first configuration setting of the first printing device relates to consumable use by the first printing device and is not related to the dot count information for the print job;
    storing the consumable use estimate with the dot count information for the print job at the estimation system;
    retrieving the stored consumable use estimate for the print job from the estimation system, wherein the stored consumable use estimate corresponds to the first configuration setting used to generate the stored consumable use estimate using the dot count information;
    applying a second configuration setting of a second printing device to the dot count information, wherein the second configuration setting of the second printing device differs from the first configuration setting of the first printing device and wherein the second configuration setting of the second printing device relates to consumable use by the second printing device and is not related to the dot count information for the print job; and
    determining that application of the second configuration setting of the second printing device to the dot count information results in an increased amount of consumable use over the stored consumable use estimate.

2. The method of claim 1, wherein the second printing device is a same model as the first printing device.

3. The method of claim 1, further comprising comparing the stored consumable use estimate for the first printing device with a current consumable estimate using the second configuration setting for the second printing device.

4. The method of claim 1, further comprising determining that the increased amount of consumable use is within a margin for the stored consumable use estimate.

5. The method of claim 4, further comprising releasing the print job to be printed on the second printing device.

6. The method of claim 1, further comprising inputting the dot count information into an estimation system to determine the stored consumable use estimate.

7. The method of claim 6, further comprising inputting the dot count information into the estimation system to determine a current consumable estimate using the second configuration setting for the second printing device.

8. The method of claim 1, wherein the estimation system includes a digital front end (DFE) emulator to determine the stored consumable use estimate.

9. A method for managing printing operations within a printing system, the method comprising:
- determining dot count information from a rendered image for a print job at a first printing device;
- estimating a stored consumable use estimate by inputting the dot count information into an estimation system;
- modifying the stored consumable use estimate with a group of first configuration settings from the first printing device, wherein the group of first configuration settings of the first printing device relates to consumable use by the first printing device and is not related to the dot count information for the print job;
- storing the dot count information and the stored consumable use estimate corresponding to the rendered image for the print job at the estimation system;
- receiving a plurality of groups of current configuration settings from a plurality of printing devices, wherein each group of current configuration settings corresponds to a respective printing device of the plurality of printing devices, wherein each group of current configuration settings relates to consumable use by the respective printing device and is not related to the dot count information for the print job, and
- wherein the plurality of printing devices includes the first printing device;
- estimating a current consumable use estimate for each group of current configuration settings;
- comparing each current consumable use estimate to the stored consumable use estimate; and
- forwarding the print job to at least one printing device of the plurality of printing devices based on the comparison.

10. The method of claim 9, further comprising determining that the current consumable use estimate for the at least one printing device matches the stored consumable use estimate.

11. The method of claim 9, further comprising determining that application of each group of the current configuration settings results in an increased amount of consumable use over the stored consumable use estimate according to each current consumable use estimate.

12. The method of claim 11, further comprising applying the group of first configuration settings to print the print job at each of the plurality of printing devices.

13. The method of claim 11, further comprising applying one of the group of current configuration settings to print the print job at each of the plurality of printing devices.

14. The method of claim 9, further comprising ranking the current consumable use estimate for each printing device.

15. The method of claim 9, wherein the stored consumable use estimate includes a stored ink use estimate.

16. The method of claim 9, wherein the group of the first configuration settings include job settings for the print job.

17. The method of claim 9, wherein the estimation system includes a digital front end (DFE) emulator to determine the stored consumable use estimate.

18. A method for determining consumable use for printing operations, the method comprising:
- determining dot count information from a rendered image for a print job at a first printing device;
- estimating a stored consumable use estimate by inputting the dot count information into a first formula at an estimation system, wherein the first formula is associated with the first printing device;
- modifying the stored consumable use estimate with configuration settings of the first printing device, wherein the configuration settings of the first printing device relates to consumable use by the first printing device and is not related to the dot count information for the print job for the print job;
- storing the dot count information and the stored consumable use estimate corresponding to the rendered image for the print job at the estimation system;
- estimating a secondary consumable use estimate by inputting the dot count information into a second formula at the estimation system, wherein the second formula corresponds to a second printing device;
- modifying the secondary consumable use estimate with configuration settings of the second printing device, wherein the configuration settings of the second printing device relates to consumable use by the second printing device and is not related to the dot count information for the print job for the print job and
- determining an increase in consumable use using the secondary settings based on the secondary consumable use estimate.

19. The method of claim 18, further comprising sending the print job to the second printing device.

20. The method of claim 18, wherein the estimation system includes a digital front end (DFE) emulator to determine the stored consumable use estimate.

* * * * *